United States Patent
Haj Hassan et al.

(10) Patent No.: US 9,560,864 B2
(45) Date of Patent: Feb. 7, 2017

(54) AERATED CHOCOLATE COMPOSITION

(71) Applicant: Conopco, Inc., Englewood Cliffs, NJ (US)

(72) Inventors: Nooshin Louise Haj Hassan, Bedford (GB); Andrew Hoddle, Rushden (GB)

(73) Assignee: CONOPCO, INC., Englewood Cliffs, NJ (US)

(*) Notice: Subject to any disclaimer, the term of this patent is extended or adjusted under 35 U.S.C. 154(b) by 0 days.

(21) Appl. No.: 14/387,763

(22) PCT Filed: Mar. 20, 2013

(86) PCT No.: PCT/EP2013/055807
§ 371 (c)(1),
(2) Date: Sep. 24, 2014

(87) PCT Pub. No.: WO2013/143938
PCT Pub. Date: Oct. 3, 2013

(65) Prior Publication Data
US 2015/0150276 A1  Jun. 4, 2015

(30) Foreign Application Priority Data

Mar. 30, 2012  (EP) .................................. 12162467

(51) Int. Cl.
A23G 1/52 (2006.01)
A23G 1/32 (2006.01)
A23G 1/00 (2006.01)

(52) U.S. Cl.
CPC ................ A23G 1/52 (2013.01); A23G 1/003 (2013.01); A23G 1/32 (2013.01)

(58) Field of Classification Search
CPC ............. A23G 1/52; A23G 1/003; A23G 1/32
See application file for complete search history.

(56) References Cited

U.S. PATENT DOCUMENTS

2003/0157231 A1  8/2003  Roberts
2006/0147584 A1  7/2006  Robert
2012/0027907 A1  2/2012  Haedelt et al.

FOREIGN PATENT DOCUMENTS

| CN | 1753620 | 3/2006 |
| CN | 1431868 | 7/2013 |
| CN | 101208013 | 7/2013 |
| DE | 3502967 | 7/1986 |
| EP | 1166639 | 1/2002 |
| JP | 2005151936 A * | 6/2005 |
| WO | WO0115543 | 3/2001 |
| WO | WO0180660 | 11/2001 |
| WO | WO2010112835 | 10/2010 |
| WO | WO 2012041629 A1 * | 4/2012 |

OTHER PUBLICATIONS

Search Report in EP12162467, Sep. 4, 2012, pp. 1-2.
Search Report in PCTEP2013055807, Jul. 10, 2013, pp. 1-3.
Written Opinion in EP12162467, Sep. 4, 2012, pp. 1-2.
Written Opinion in PCTEP201355807, Jul. 10, 2013, pp. 1-5.
Alderliesten, M. "Mean Particle Diameters Part II: Standardization of Nomenclature" Pat. Part. Syst. Charact. 1991, 8, 237-241.
Patra, S. et al. "Bubble formation in complex fluids using an orifice in throat arrangement" Exp. Therm. Fluid Sci. 2015, 64, 62-69.

* cited by examiner

*Primary Examiner* — Kelly Bekker
(74) *Attorney, Agent, or Firm* — Foley & Lardner LLP

(57) ABSTRACT

Aerated chocolate composition having an overrun of between 25% and 150%, preferably under 100%, comprising red and black non aqueous pigments in amount of over 0.05% w/w and less than 1.5% w/w in a red:black ratio of between 3:1 and 1:1.

4 Claims, No Drawings

AERATED CHOCOLATE COMPOSITION

The present invention relates to an aerated chocolate composition.

BACKGROUND OF THE INVENTION

The pleasant flavour and superior texture are the two major characteristics of chocolate. Chocolate must be solid in room temperature, and yet melt rapidly in the mouth at 37° C. to give the smooth mouth feeling. Dark chocolate, milk chocolate and white chocolate are the three major flavours.

Chocolate is often used as a coating in the food industry. The inventors have investigated means for reducing the calorific value of the chocolate but without reducing the sensory experience provided by the chocolate coating.

Aerated or foamed chocolate are well known products on the market. Examples are Nestle aero, and Mars Skye bar. The main methods for the manufacturing of aerated chocolate are that (1) gas is mixed there into by dissolving under high pressure then the quickly released gas cells can be locked in the solid chocolate matrix; (2) The molten chocolate is continuously stirred to foam followed by cooling, so called whipped chocolate (EP 1 166 639 A1).

In the first method, the gases such as air or carbon dioxide, can be dissolved in molten chocolate under high pressure with or without the help of stirring. After depressurisation, the dissolved gas will come out to form gas cells in the chocolate, and these gas cells will be locked in the chocolate matrix if the temperature is quickly cooled down below the melting temperature of chocolate during the depressurisation process. The solidified chocolate will keep the gas cells and stabilise the prepared chocolate foam. However, the gas cells are normally big and the aeration is not easy to control. If the chocolate is above its melting temperature, the chocolate foam is not stable and thus the coating, dipping and rolling which are common for chocolate application, can not be applied to the chocolate foam prepared by this method.

In any case, it has been observed that aerated chocolate is lighter in colour than unaerated chocolate, and this may be perceived by the consumer as chocolate which is 'milkier' and therefore not containing a high level of cocoa. Depending on the context, this may give an impression of reduced quality chocolate. As the degree of aeration increases, so to does the lightening of the chocolate.

This problem has been recognised for a long time and WO0115543 describes a process for coating a food product comprises applying a coating of aerated liquid confectionery material and applying on top of this another coating or relatively unaerated liquid confectionery material to improve the colour of the item. Apart form the fact that it requires a two step process, it also tends to defeat the purpose of using aerated chocolate since it requires adding unaerated chocolate on top.

It has now been found that it is possible to aerate chocolate while preserving its colour by adding a carefully selected pigment.

Tests and Definitions

Sucrose Esters

Sucrose esters of fatty acids can be obtained by esterifying one or more of the hydroxyl group of a sucrose molecule with fatty acids. The fatty acids react with one or more hydroxyl groups to form mono, di, tri or multi-fatty acid ester, or mixture thereof. Preferably the sucrose ester emulsifier comprises a mixed ester or homo-ester. The fatty acid is preferably selected from the group consisting of lauric acid, myristic acid, palm itic acid, stearic acid and mixtures thereof.

Chocolate

By the term "chocolate" is meant dark chocolate, milk chocolate, white chocolate, flavoured chocolate, couverture chocolate, compound chocolate (which is made from a combination of cocoa solids, non-cocoa butter vegetable fat and sweeteners) and mixtures thereof. The chocolate may also comprise inclusions such as nuts or pieces thereof, dried fruit, such as raisins, or pieces thereof, biscuit and mixtures thereof. The chocolate must, however, remain substantially anhydrous. By the term "substantially anhydrous" is meant comprising no more than 5%, preferably no more than 3%, more preferably no more than 1% w/w water.

HLB Value

The HLB value is given by the equation $HLB = 20*M_h/M$, where $M_h$ is the molecular mass of the hydrophilic part of the molecule and M is the molecular mass of the whole molecule thus giving a value on an arbitrary scale of 0 to 20.

For fatty acid esters, $HLB = 20(1-S/A)$ where

S=Saponification value

A=Acid number of the fatty acid

Therefore an HLB value of 0 corresponds to a completely hydrophobic molecule and an HLB value of 20 corresponds to a completely hydrophilic molecule.

Typical HLB values are:

0 to 3 an anti-foaming agent 4 to 6 a water-in-oil emulsifier 7 to 9 a wetting agent 8 to 18 an oil-in-water emulsifier 13 to 15 a detergent 10 to 18 a solubiliser or a hydrotrope Optical Microscopy Optical microscopy was used to measure the bubble morphology in the aerated chocolate. The samples were placed on a glass slide and covered with a cover slip. The optical images were taken on a Polyvar microscope (Reichert-Jung Limited). For the morphological study of foams, a 200 µm spacer was used between the slide and cover slip to protect the bubble from deformation.

Scanning Electron Microscopy

Aerated chocolates were prepared for cryo-scanning electron microscopy by cooling it immediately after preparation to 50 degrees centigrade and placing it on a 10 mm diameter aluminium sample holder drilled with a 5 mm diameter depression. The sample holder was then immediately plunged into nitrogen slush, transferred to a Gatan Alto 2500 low temperature preparation chamber and warmed to −90 degrees centigrade for fracture and coating with 2 nm Au/Pd. The coated sample was then transferred to a Jeol 6301F field emission scanning electron microscope fitted with a Gatan cold stage and examined at −150 degrees centigrade. Images were obtained at 5 kV.

SUMMARY OF THE INVENTION

An aerated chocolate composition is provided, the aerated chocolate composition having an overrun of between 25% and 150%, preferably under 100%, comprising red and black non aqueous pigments in amount of over 0.05% w/w and less than 1.5% w/w, preferably less than 1% w/w, in a red:black ratio of between 3:1 and 1:1.

Preferably, the aerated chocolate composition has an overrun of at least 30% and a ΔL of less than 2.6.

Preferably 80% of the cumulative area weighted size air bubble distribution is below 60 µm. Preferably, 95% of the cumulative area weighted size distribution is below 125 µm, preferably below 100 µm. Preferably, 99% of the cumulative area weighted size distribution is below 150 µm.

Preferably, the aerated chocolate composition contains 0.1-10%, more preferably 0.5-5% w/w, even more preferably, below 2.5% w/w, of at least one sucrose ester having an HLB value of up to 9. More preferably the HLB value is above 1, even more preferably the HLB is between 3 and 8. Even more preferably the HLB value is between 4 and 8.

Preferably the chocolate composition is substantially anhydrous.

Preferably, the overrun of the aerated chocolate composition is stable. It means that the overrun of the composition does not decrease by more than 20%, preferably 10%, most preferably 5% over a period of 24 hours when the composition is kept at a temperature of at least 40 degrees centigrade. For example when a stable overrun is defined as one which does not decrease by more than 20%, an initial overrun of 200% can only decrease to 180% beyond which the overrun is not stable.

Thus a chocolate composition has now been provided which keeps its chocolate colour despite aeration and which, on a volume basis, has a lower calorific value than an un-aerated chocolate composition as a proportion of the volume of the aerated chocolate composition comprises a gas. A further advantage of such a chocolate composition is the different sensorial effect that such a composition has over an un-aerated chocolate composition due to the presence of gas bubbles which burst on the tongue on consumption of the composition.

A particular advantage of the stable aerated chocolate composition is that the gas bubbles are not visible to the human eye and thus do not detract from the visible appearance of the chocolate composition. This is particularly important when the composition is used to provide a coating.

Another important advantage is that the overrun is maintained on re-melting. This is important as chocolate compositions are often supplied in a solid form and re-melted just prior to use. This advantage obviates the need for the user to aerate the chocolate composition just prior to use saving on equipment costs and time. Typically, the overrun loss during re-melting is less than 10%.

In a 2nd aspect of the invention, a process for manufacturing the stable chocolate aerated composition is provided, the process comprising the steps of:
(a) Providing the chocolate composition of the first aspect of the invention, wherein the chocolate composition containing the at least one sucrose ester is melted at a temperature of between the melting temperature of the at least one sucrose ester and 30 degrees Celsius, preferably 20 degrees Celsius, more preferably 15 degrees Celsius, most preferably 10 degrees Celsius above the melting temperature of the at least one sucrose ester; then
(b) Mechanically aerating the chocolate composition at a temperature of between 40 degrees Celsius and 30 degrees Celsius, preferably 20 degrees Celsius, more preferably 15 degrees Celsius, most preferably 10 degrees Celsius above the melting temperature of the at least one sucrose ester to a desired overrun thereby to produce a an aerated chocolate composition; and then
(c) Optionally cooling the aerated chocolate composition.
Wherein red and black non aqueous pigments in amount of over 0.1 Wt % and less than 1.5% in a red:black ratio of between 3:1 and 1:1 are added prior to aeration.

Preferably the chocolate composition is mechanically aerated using a high speed stirrer, a high speed whisk or a homogeniser.

General Description

The invention will be further described in the following examples

Chocolate was stored at 65° C. for a minimum of 1 hour. Sucrose ester (S570) was added at the required concentration, and the chocolate gently stirred until homogenous. Any addition of pigment took place at the same time as sucrose ester addition. The chocolate was equilibrated for a further 2 hours at 65° C. 1 kg of the chocolate was then placed in a Kenwood mixer and whipped at a setting of 2, for a period of 8-20 minutes, according to the overrun required. Overrun was measured on the molten chocolate immediately after aeration, by filling a 31 ml plastic pot to the top and noting the weight. This allowed calculation of density, and using such values the overrun was calculated as:

Overrun=(density of unaerated chocolate−density of aerated chocolate)×100/density of aerated chocolate)

Small shallow pots were filled with the aerated chocolate and placed in a −18° C. freezer to rapidly harden the chocolate, in a manner similar to coating an ice cream product. After a period of equilibration at −18° C. (>3 days), the samples were placed at 2° C. to equilibrate before colour measurement, to avoid problems with condensation on the surface during colour measurement. Colour measurement was carried out using a Minolta Colourimeter to measure L (Lightness), a (red to green) and b (Blue to yellow). These values were used to calculate Delta E.

Experiments were done using 0.4% w/w Carbon Black (Natracol Carbon Black powder, N04150001, product code: 42033, Batch 1307-9, ROHA UK ltd., Unit 6b Lodgeway, Severnbridge Ind. Est., Caldicot, Monmouthshire, NP265pt), or alternatively 0.4% w/w Black Lake (Black Lake blend -004, GIN No:692994, Batch 122709-L, CHR Hansen Inc., 9015 West Maple Street, Milwaukee, Wis. 53214) and chocolate which had been pre-aerated to 65% overrun. Whilst this darkened the chocolate, the desirable shades of colour were lost. A combination was found, where a 2:1 ratio of red:black gave a colour and darkness similar to the starting chocolate.

It was found that either 0.4% Black Lake and 0.8% Red Beet colour (Natracol Beet Red WSP, N12100001, Product code:42202, Batch 112910, ROHA UK ltd) or 0.4% Carbon Black and 0.8% Carmine (Natracol Carmine XB N05110001, Product code:42316, Batch 382611074, ROHA UK ltd) gave similar effect in returning a pre-aerated chocolate of 65% overrun back to its original unaerated colour and darkness.

It was found that less colour was needed where it was added before aeration than when added to a pre-aerated chocolate.

The various experiments are summarised in the following table wherein
three different chocolates were used (referred to as Classic, Almond and Tanzania)
Sucrose Ester content was between 0.6 and 2% wt
Overrun was between 0 and 94%
Pigment (2:1 red:black) was between 0 and 1% wt
L*, a*, b*. ΔL and ΔE were measured.

|  | % SE | Overrun % | Pigment % | av L* | av a* | av b* | ΔL* | ΔE |
|---|---|---|---|---|---|---|---|---|
| Classic | 0.6 | 0 | 0 | 33.51 | 9.595 | 7.835 | | |
| Classic | 0.6 | 14 | 0 | 35.025 | 9.87 | 8.535 | 1.515 | 1.691 |
| Classic | 0.6 | 49 | 0 | 40.025 | 11.94 | 12.965 | 6.515 | 8.617 |
| Classic | 1.5 | 38 | 0 | 39.77 | 11.33 | 11.7 | 6.26 | 7.559 |
| Classic | 1.5 | 85 | 0 | 45.99 | 12.395 | 16.09 | 12.48 | 15.223 |
| Classic | 0.5 | 17 | 0.1 | 30.06 | 5.805 | 3.435 | −3.45 | 6.755 |
| Classic | 0.6 | 44 | 0.1 | 33.755 | 9.165 | 8.47 | 0.245 | 0.805 |
| Classic | 1.5 | 80 | 0.5 | 33.785 | 6.175 | 3.705 | 0.275 | 5.369 |
| Classic | 2 | 94 | 0.7 | 34.745 | 6.78 | 3.745 | 1.235 | 5.116 |
| Classic | 1.8 | 76 | 1 | 35.465 | 6.78 | 2.64 | 1.955 | 6.224 |
| Almond | 1.5 | 0 | 0 | 39.775 | 11.75 | 13.02 | | |
| Almond | 1.5 | 55 | 0 | 51.745 | 11.81 | 18.035 | 11.97 | 12.978 |
| Almond | 1.5 | 70 | 0 | 53.745 | 11.715 | 18.99 | 13.97 | 15.192 |
| Almond | 0.8 | 53 | 0.05 | 43.495 | 9.54 | 11.895 | 3.72 | 4.471 |
| Almond | 1 | 58 | 0.1 | 39.455 | 8.62 | 8.045 | −0.32 | 5.886 |
| Tanzanian | 0.6 | 0 | 0 | 29.38 | 7.42 | 3.405 | | |
| Tanzanian | 0.6 | 29 | 0 | 31.485 | 9 | 5.04 | 2.105 | 3.098 |
| Tanzanian | 1.5 | 61 | 0 | 33.99 | 12.365 | 9.9 | 4.61 | 9.375 |
| Tanzanian | 1.5 | 68 | 0 | 33.62 | 12.47 | 9.3 | 4.24 | 8.845 |
| Tanzanian | 1.5 | 29 | 0 | 32.425 | 8.82 | 4.97 | 3.045 | 3.699 |
| Tanzanian | 1.5 | 78 | 0 | 36.795 | 11.995 | 9.77 | 7.415 | 10.790 |
| Tanzanian | 0.6 | 7 | 0.1 | 25.88 | 5.275 | 1.87 | −3.5 | 4.383 |
| Tanzanian | 1 | 63 | 0.2 | 30.84 | 7.42 | 4.64 | 1.46 | 1.912 |
| Tanzanian | 1.5 | 70 | 0.3 | 31.95 | 7.51 | 5.065 | 2.57 | 3.061 |

From this it is clear that the addition of low levels of certain pigments to chocolate prior to aeration can prevent the lightening of the chocolate.

The invention claimed is:

1. An aerated chocolate composition having an overrun of between 25% and 150% and comprising red and black non aqueous, non-cocoa pigments in amount of over 0.05 Wt % and less than 1.5% in a red:black ratio of between 3:1 and 1:1, wherein the red and black non aqueous, non-cocoa pigments are intermixed homogenously throughout the aerated chocolate composition.

2. The aerated chocolate composition of claim 1, wherein the overrun is under 100%.

3. The aerated chocolate composition according to claim 1 containing 0.1 to 10% w/w of at least one sucrose ester having an HLB value of up to 9.

4. The aerated chocolate composition according to claim 1 containing 0.5 to 5% w/w of at least one sucrose ester having an HLB value of up to 9.

* * * * *